(12) United States Patent
Morita et al.

(10) Patent No.: US 7,190,553 B2
(45) Date of Patent: Mar. 13, 2007

(54) THIN-FILM MAGNETIC HEAD HAVING LOWER MAGNETIC POLE LAYER AND INSULATOR LAYER BEHIND THE LOWER MAGNETIC POLE LAYER IN THE DIRECTION OF HEIGHT OF THE POLE LAYER, AND METHOD FOR MANUFACTURING THE THIN-FILM MAGNETIC HEAD

(75) Inventors: Sumihito Morita, Niigata-ken (JP); Naruaki Oki, Niigata-ken (JP); Hisayuki Yazawa, Niigata-ken (JP); Minoru Yamada, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 402 days.

(21) Appl. No.: 09/822,576

(22) Filed: Mar. 30, 2001

(65) Prior Publication Data
US 2001/0028531 A1    Oct. 11, 2001

(30) Foreign Application Priority Data
Apr. 4, 2000    (JP)    ............... 2000-106726

(51) Int. Cl.
*G11B 5/147*    (2006.01)
(52) U.S. Cl. .................................... 360/126
(58) Field of Classification Search ................. 360/126
See application file for complete search history.

(56) References Cited

U.S. PATENT DOCUMENTS

| | | | |
|---|---|---|---|
| 5,245,493 A * | 9/1993 | Kawabe et al. ............. | 360/126 |
| 5,652,687 A * | 7/1997 | Chen et al. .................. | 360/126 |
| 5,793,578 A | 8/1998 | Heim et al. .................. | 360/126 |
| 5,798,897 A | 8/1998 | Chang et al. ................ | 360/126 |
| 5,805,391 A * | 9/1998 | Chang et al. ................ | 360/317 |
| 5,828,533 A * | 10/1998 | Ohashi et al. ............... | 360/126 |
| 5,872,693 A * | 2/1999 | Yoda et al. .................. | 360/126 |
| 6,104,576 A * | 8/2000 | Santini ........................ | 360/126 |
| 6,134,080 A * | 10/2000 | Chang et al. ................ | 360/126 |
| 6,301,076 B1 * | 10/2001 | Stageberg et al. ........... | 360/126 |
| 6,330,127 B1 * | 12/2001 | Sasaki ......................... | 360/126 |
| 6,381,095 B1 * | 4/2002 | Sin et al. ..................... | 360/126 |
| 6,407,885 B1 * | 6/2002 | Ahagon et al. .............. | 360/126 |
| 6,483,664 B2 * | 11/2002 | Kamijima .................... | 360/126 |
| 6,597,543 B1 * | 7/2003 | Saitho et al. ................ | 360/317 |

FOREIGN PATENT DOCUMENTS

| | | |
|---|---|---|
| JP | 04-344307 | 11/1992 |
| JP | 09-007118 | 1/1997 |
| JP | 2000-149219 | 5/2000 |

* cited by examiner

*Primary Examiner*—David Davis
(74) *Attorney, Agent, or Firm*—Brinks Hofer Gilson & Lione

(57) ABSTRACT

In a thin-film magnetic head, a lower magnetic pole layer and a planarizing magnetic layer in continuity with the lower magnetic layer are arranged. Since a coil formation surface is positioned lower than the top surface of the lower magnetic pole layer and the planarizing magnetic layer, the front end of an upper magnetic core layer is formed to be a predetermined track width with a high accuracy. A thin-film magnetic head having good information writing characteristics and a method for manufacturing the thin-film magnetic head are thus provided.

15 Claims, 11 Drawing Sheets

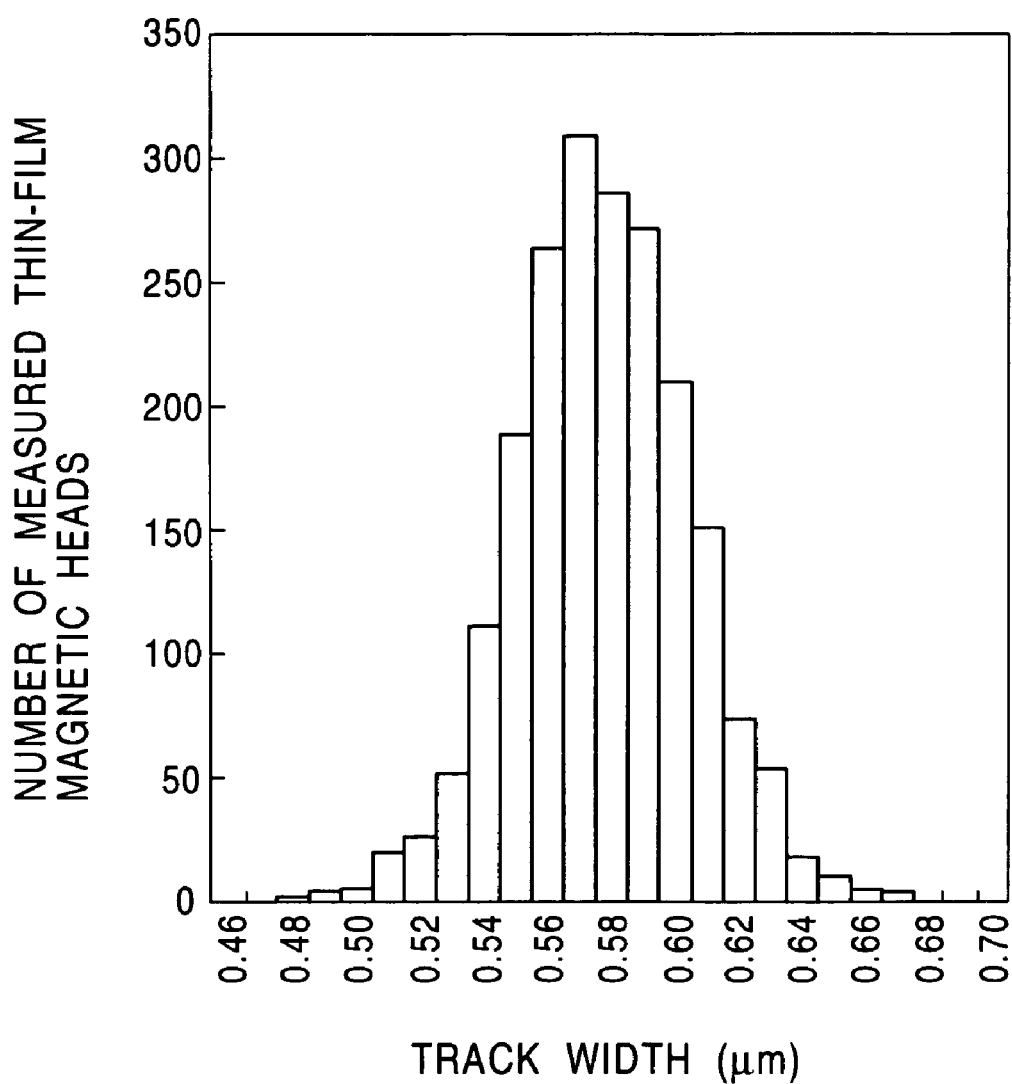

THIN-FILM MAGNETIC HEAD HAVING LOWER MAGNETIC POLE LAYER AND INSULATOR LAYER BEHIND THE LOWER MAGNETIC POLE LAYER IN THE DIRECTION OF HEIGHT OF THE POLE LAYER, AND METHOD FOR MANUFACTURING THE THIN-FILM MAGNETIC HEAD

BACKGROUND OF THE INVENTION

1. Field of the Invention

The present invention relates to thin-film magnetic heads for writing information onto a magnetic recording medium and, more particularly, to a magnetic recording head having a plurality of insulator layers.

2. Description of the Related Art

FIG. 8 through FIG. 10D show the conventional technique used in this sort of the magnetic recording head. Referring to FIG. 8, a thin-film magnetic head 21 includes a gap layer 23 made of alumina, a first insulator layer 24 made of an organic insulating material, and an electrically conductive spiraling coil layer 25 made of an electrically conductive low-resistance material such as Cu, successively laminated in that order on a lower magnetic core layer 22 fabricated of a magnetically soft material such as an Fe—Ni based alloy (permalloy). A second insulator layer 26, made of an organic insulating material, for covering the electrically conductive coil layer 25 is formed on the first insulator layer 24. An upper magnetic core layer 27 made of a magnetically soft material such as an Fe—Ni based alloy is formed on the second insulator layer 26. A linear pole region 28 of the upper magnetic core layer 27 covers slopes 24a and 26a of the first and second insulator layers 24 and 26 at the respective end faces thereof, and the top of the end portion of the gap layer 23.

A magnetic gap 30 is formed between the lower magnetic core layer 22 and the upper magnetic core layer 27 at the end 29 facing a medium. The distance between the medium facing end 29 and the front end of the first insulator layer 24 is a gap depth Gd. The gap depth zero position is defined by the front end of the first insulator layer 24. The upper magnetic core layer 27 is narrower in width than the lower magnetic core layer 22. Referring to FIG. 9, the narrower end portion of the pole region 28 has a track width Tw. The track width Tw is thus defined by the width of the front end portion of the pole region 28 of the upper magnetic core layer 27.

When the electrically conductive coil layer 25 is supplied with a recording current in the thin-film magnetic head 21 thus constructed, a recording magnetic field is induced between the lower magnetic core layer 22 and the upper magnetic core layer 27. A leakage magnetic field leaked from the magnetic gap 30 at the medium facing end 29 thus writes information onto a magnetic recording medium.

The thin-film magnetic head 21 is manufactured in a process sequence as shown in FIGS. 10A through 10C. Formed on the lower magnetic core layer 22 are the gap layer 23, the first insulator layer 24, and the second insulator layer 26. Referring to FIG. 10D, an underlying layer 31 made of a magnetically soft material such as an Fe—Ni based alloy is plated over from the front end portion of the gap layer 23 to the second insulator layer 26. A resist layer 32 is then applied on the plated underlying layer 31. Using photolithographic technique, the resist layer 32 is subjected to exposure and development processes to partially remove the resist layer 32. The resist layer 32 thus has a pattern corresponding to the upper magnetic core layer 27 including the pole region 28. The pattern having no resist layer 32 is electroplated, thereby forming the upper magnetic core layer 27 and the pole region 28. Removing the residual resist layer 32 completes the production of the thin-film magnetic head 21.

In this conventional thin-film magnetic head 21, the first insulator layer 24 is formed on the gap layer 23, and the second insulator layer 26 is formed on the first insulator layer 24. The thickness T1 from the top surface of the gap layer 23 to the top surface of the second insulator layer 26 is large. Since the resist layer 32 to be applied onto the plated underlying layer 31 is flowable, the thickness T2 of the resist layer 32 becomes large on the top of the end portion of the gap layer 23 to the slopes 24a and 26a of the first and second insulator layers 24 and 26. In this area, a resolution of the photolithographic technique is substantially degraded. As a result, the dimensional accuracy of the pattern of the resist layer 32 is greatly lowered. The width of the front end portion of the pole region 28 of the upper magnetic core layer 27, namely, the track width Tw is not formed with a high accuracy. A narrower track is difficult to produce.

When the resist layer 32 is patterned through the photolithographic technique, a light beam to which the resist layer 32 is exposed is reflected diffusely from the slopes 24a and 26a formed at the end faces of the first and second insulator layers 24 and 26, thereby distorting the pattern. The front end portion of the pole region 28 of the upper magnetic core layer 27 is not produced to a predetermined track width Tw with a high accuracy. This problem is resolved by extending the pole region 28, namely, by receding the first and second insulator layers 24 and 26 in the back portion of the upper magnetic core layer 27 in the direction represented by an arrow Y. This arrangement causes a gap depth Gd to be lengthened, thereby adversely affecting information writing characteristics such as overwrite characteristics to the magnetic recording medium.

FIG. 11 is a graph plotting the results of measurement of the track width Tw of a plurality of thin-film magnetic heads 21. The track width of the thin-film magnetic head 21 substantially varies with respect to a rated 0.57 μm and there are many thin-film magnetic heads 21 having the track widths thereof out of the rated track width.

SUMMARY OF THE INVENTION

Accordingly, it is an object of the present invention to provide a thin-film magnetic head and a manufacturing method for manufacturing the thin-film magnetic head which enables a front end portion of an upper magnetic core layer to be manufactured to a predetermined track width with a high accuracy, thereby presenting excellent information writing characteristics.

The present invention in one aspect relates to a thin-film magnetic head and includes an upper magnetic core layer, a lower magnetic core layer arranged to be opposed to the upper magnetic core layer, an electrically conductive coil layer sandwiched between the upper magnetic core layer and the lower magnetic core layer, a first insulator layer, sandwiched between the lower magnetic core layer and the electrically conductive coil layer, for electrically insulating the lower magnetic core layer from the electrically conductive coil layer, a second insulator layer, sandwiched between the upper magnetic core layer and the electrically conductive coil layer, for electrically insulating the upper magnetic core layer from the electrically conductive coil layer, wherein the first insulator layer is arranged on the lower magnetic core layer except the front end portion of the lower magnetic core layer facing the front end portion of the upper magnetic core layer, a lower magnetic pole layer having a thickness equal to that of the first insulator layer is arranged in continuity with the end of the first insulator layer on the front end portion of the lower magnetic core layer between the upper magnetic core layer and the lower magnetic core layer, the front end portion of the upper magnetic core layer is arranged on a gap layer on the lower magnetic pole layer, and the second insulator layer is positioned behind the lower magnetic pole layer and close to the back end of the upper magnetic core layer.

Preferably, the first insulator layer includes a recess, for receiving the electrically conductive coil layer, arranged at a predetermined distance from the lower magnetic pole layer, between the lower magnetic pole layer and the back end portion of the upper magnetic core layer.

Preferably, the upper magnetic core layer includes a narrow-width pole region with the end portion thereof formed on the gap layer on the lower magnetic pole layer, and a yoke region being wider in width than the pole region, arranged in continuity with the back end of the pole region, and the back end of the pole region is opposed to the first insulator layer between the lower magnetic pole layer and the recess.

Preferably, each of the upper magnetic core layer and the lower magnetic pole layer is of a dual-layer structure, the bottom layer of the upper magnetic core layer is arranged on the gap layer on the top layer of the lower magnetic pole layer, and the saturation flux density of the bottom layer of the upper magnetic core layer and the top layer of the lower magnetic pole layer is set to be higher than the saturation flux density of the top layer of the upper magnetic core layer and the bottom layer of the lower magnetic pole layer.

Preferably, the gap layer extends between the electrically conductive coil layer and the first insulator layer.

Preferably, the lower magnetic core layer also serves as a top shield layer of a magnetoresistive head for reading information from a magnetic recording medium.

The present invention in another aspect relates to a method for manufacturing a thin-film magnetic head and includes a step of forming a lower magnetic pole layer on a lower magnetic core layer, a step of forming a first insulator layer on the lower magnetic core layer in a manner such that the first insulator layer is arranged in continuity with the back end of the lower magnetic pole layer, a step of polishing the first insulator layer so that the thickness of the first insulator layer is equal to the thickness of the lower magnetic pole layer, a step of forming a recess in the first insulator layer, a step of forming a gap layer on the lower magnetic pole layer and the first insulator layer in a manner such that the gap layer extends into the recess, a step of forming an electrically conductive coil layer on the gap layer formed in the recess, a step of forming a second insulator layer for covering the electrically conductive coil layer on the gap layer so that the front end portion of the second insulator layer is positioned behind the lower magnetic pole layer, and a step of forming an upper magnetic core layer on the second insulator layer and the gap layer.

The present invention in yet another aspect relates to a thin-film magnetic head and includes a lower magnetic core layer, a lower magnetic pole layer formed on the lower magnetic core layer, a non-magnetic gap layer formed at least on the lower magnetic pole layer, an upper magnetic core layer on the gap layer in a surface facing a recording medium, and a coil layer formed behind the lower magnetic layer in the direction of height, for inducing a recording magnetic field in the lower magnetic core layer and the upper magnetic core layer. The upper magnetic core layer includes a front end region having a track width and exposed on the surface facing the recording medium, and a backward region extending backward from the back end of the front end region in the direction of height, the backward region having the width widening as the upper magnetic core layer runs backward. A planarizing insulator layer is formed to keep in the direction of height a flat surface at the same level in continuity with the top surface of the lower magnetic pole layer, wherein the planarizing insulator layer has a flat surface remaining constant in level and a downwardly inclined surface so that the planarizing insulator layer is gradually thinner toward the backward end thereof. The flat surface is higher in level than a coil layer formation surface on which the coil layer is formed.

Preferably, the coil layer is formed directly on the planarizing insulator layer extending backward in the direction of height or on the gap layer formed on the planarizing insulator layer.

Preferably, the top surface of the planarizing insulator layer is higher in level than the coil layer formation surface of the coil layer and lower in level than the top surface of the coil layer.

Preferably, the lower magnetic pole layer is higher in saturation flux density than the lower magnetic core layer.

Preferably, the lower magnetic pole layer includes a laminate of at least two magnetic layers and a magnetic layer closer to the gap layer has a higher saturation flux density.

Preferably, the upper magnetic core layer on the front end portion thereof includes a laminate of at least two magnetic layers, and a magnetic layer closer to the gap layer has a higher saturation flux density.

BRIEF DESCRIPTION OF THE DRAWINGS

FIG. 11 is a graph plotting results of measurement of track widths of the conventional thin-film magnetic heads;

DESCRIPTION OF THE PREFERRED EMBODIMENTS

One embodiment of a thin-film magnetic head of the present invention is discussed with reference to FIG. 1 through FIG. 7. The thin-film magnetic head is here combined with a magnetoresistive effect head for reading information from a magnetic recording medium. The magnetoresistive head can be an anisotropic magnetoresistive (AMR) effect head, a giant magnetoresistive (GMR) effect head, a tunneling magnetoresistive (TMR) effect head, etc.

Figure 1:
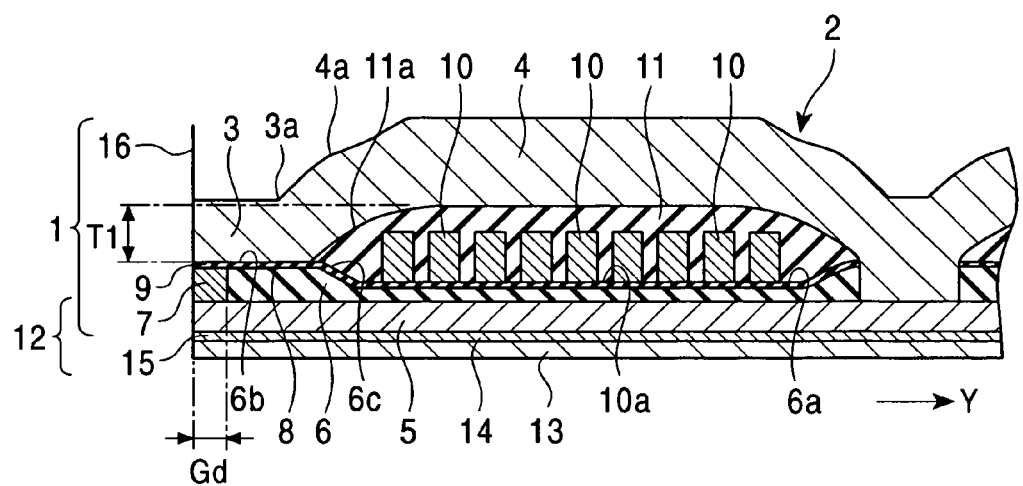
FIG. 1 is a cross-sectional view of a thin-film magnetic head of the present invention.

Referring to FIG. 1, a thin-film magnetic head 1 includes a lower magnetic core layer 5 serving a top shield layer of a magnetoresistive effect head 12, a first insulator layer 6 and a lower magnetic pole layer 7 formed on the lower magnetic core layer 5, a gap layer 8 formed on the first insulator layer 6 and the lower magnetic pole layer 7, an electrically conductive layer 10 formed on the gap layer 8, a second insulator layer 11 for covering the electrically conductive layer 10, and an upper magnetic core layer 2, formed on the second insulator layer 11, for covering a sloping surface 11a at the front end of the second insulator layer 11 and the top surface of the front end portion of the gap layer 8. The end faces of the upper and lower magnetic core layer 2 and 5, the gap layer 8, and the lower magnetic pole layer 7 form a medium facing surface 16 opposed to a magnetic recording medium.

Figure 2:
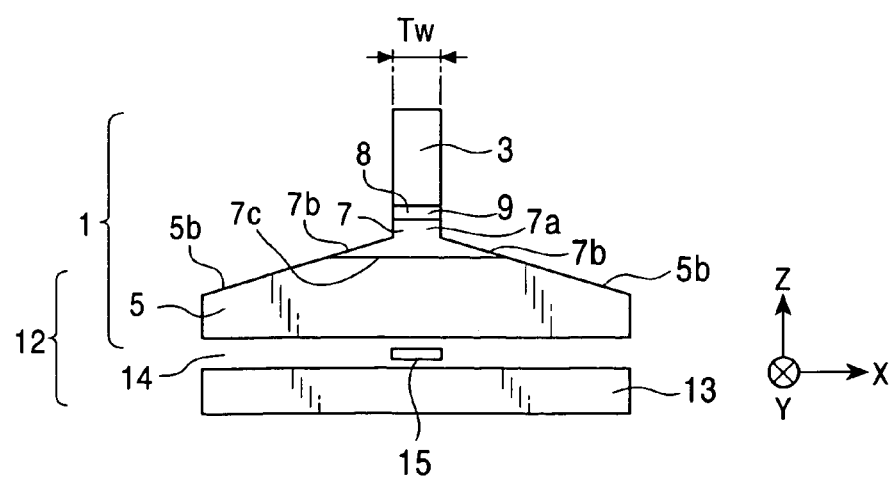
FIG. 2 is a partial font view of the thin-film magnetic head, viewed from a recording medium.

The magnetoresistive effect head 12 combined with the thin-film magnetic head 1 includes the lower magnetic core layer 5 serving as the top shield layer, a lower shield layer 13 fabricated of a magnetically soft material such as an Fe—Ni based alloy (permalloy) arranged to be opposed to the lower magnetic core layer 5, and a rectangular magnetoresistive effect element 15 and a non-magnetic insulator layer 14, both sandwiched between the lower magnetic core layer 5 and the lower shield layer 13. The end faces of the lower magnetic core layer 5, the lower shield layer 13, the non-magnetic insulator layer 14, and the magnetoresistive effect element 15 form the medium facing surface 16. When the magnetoresistive effect head 12 is arranged beneath the lower magnetic core layer 5, another shield layer for shielding the magnetoresistive effect head 12 from noise may be laminated in addition to the lower magnetic core layer 5. Alternatively, the lower magnetic core layer 5 may serve as a top shield layer for the magnetoresistive effect head 12 as shown in FIGS. 1 and 2, rather than using an additional shield layer. Insulator layers, although not shown, are laminated on both sidewalls of the lower magnetic core layer 5 viewed in a track width direction (i.e., in the x direction).

The layers of the thin-film magnetic head 1 are now discussed in detail.

Figure 3:
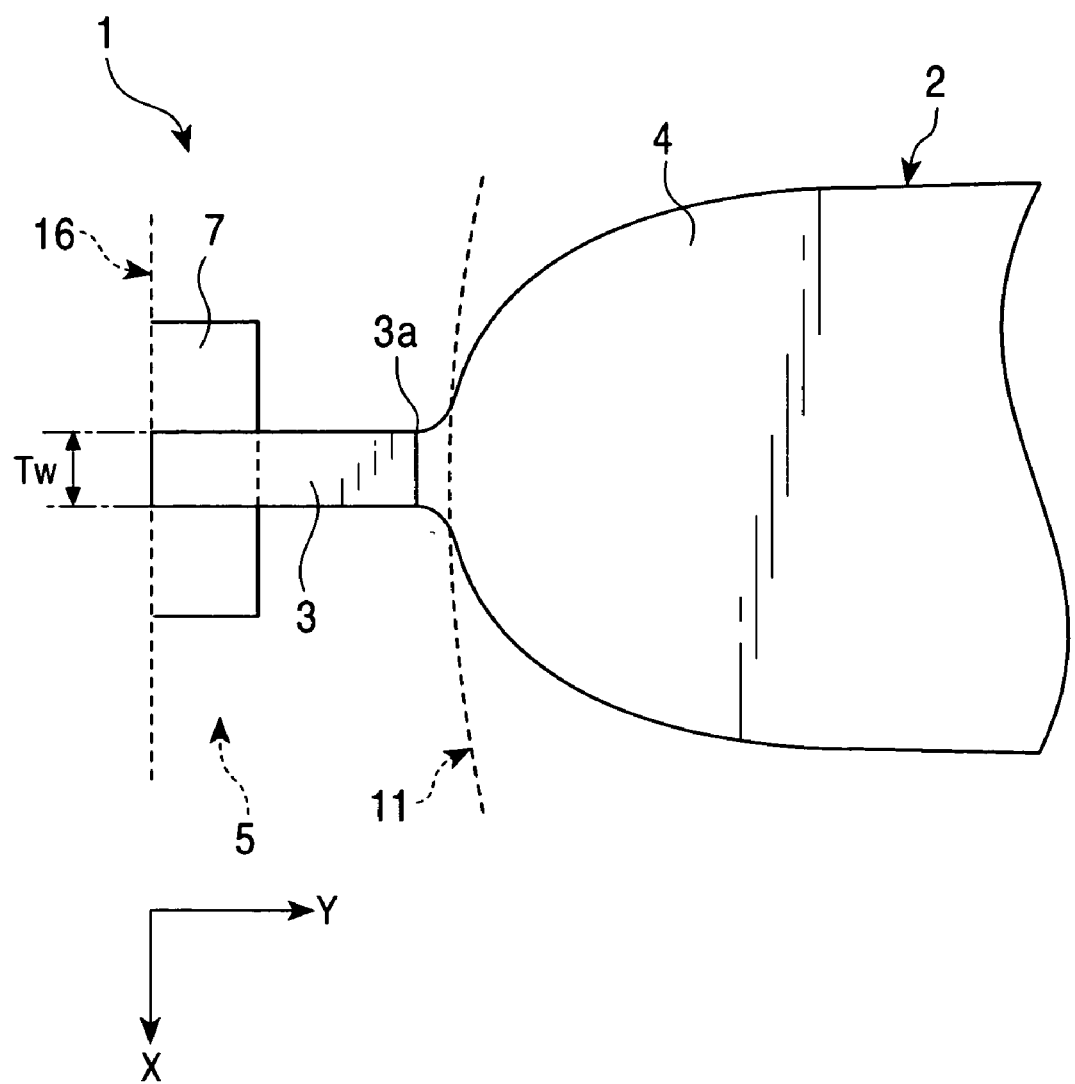
FIG. 3 is a plan view of the thin-film magnetic head of the present invention.

"The upper magnetic core layer 2, fabricated of a magnetically soft material such as an Fe—Ni based alloy, includes, on the front end portion thereof, a narrow-width pole region 3 with its end face serving as the medium facing surface 16, and on the back portion thereof, a yoke region 4 in continuity with the back end 3a of the pole region 3. The yoke region 4 has, on the front end portion thereof, a sloping surface 4a gradually rising from the back end 3a of the pole region 3 in a formation conformal to the shape of the second insulator layer 11 therebeneath. The distance from the back end 3a of the pole region 3 to the medium facing surface 16 defines the length of the pole region 3. Referring to FIGS. 2 and 3, the width of the front end portion of the pole region 3 defines a track width Tw. Referring to FIG. 3, the yoke region 4 as the back portion of the upper magnetic core layer 2 widens in the track width direction (i.e., in the X axis direction) as the yoke region 4 runs in the direction of height (represented by an arrow Y)."

Referring to FIG. 2, in the medium facing surface 16, the gap layer 8 sandwiched between the upper magnetic core layer 2 having the track width Tw and the lower magnetic pole layer 7 has the track width Tw. The lower magnetic pole layer 7 has the track width Tw on the junction surface thereof with the gap layer 8. In this embodiment, the lower magnetic pole layer 7 includes a shoulder portion 7c in contact with the lower magnetic core layer 5, and a neck portion 7a having a width narrower than that of the shoulder portion 7c and extending toward the pole region 3. The top surface of the neck portion 7a having the track width Tw joins the gap layer 9.

The lower magnetic pole layer 7 has, on the two sidewalls thereof, sloping surfaces 7b and 7b that are inclined and spaced apart from the pole region 3 of the upper magnetic core layer 2 as the lower magnetic pole layer 7 extends in the direction of width. The lower magnetic core layer 5 has sloping surfaces 5b and 5b which extend respectively in continuity with the sloping surfaces 7b and 7b of the lower magnetic pole layer 7.

The lower magnetic core layer 5, fabricated of a magnetically soft material such as an Fe—Ni based alloy, is arranged to be opposed to the upper magnetic core layer 2. As shown in FIG. 1, the lower magnetic core layer 5 is magnetically coupled to the upper magnetic core layer 2 on the back end portion thereof. The lower magnetic core layer 5 has a function of preventing magnetic fields, other than a leakage magnetic field from the magnetic recording medium, from affecting the magnetoresistive effect element 15. The lower magnetic core layer 5 is designed to be larger in width than the upper magnetic core layer 2.

The first insulator layer 6 is fabricated of an inorganic insulator material such as alumina, or an organic insulator material such as a novolak resin. The first insulator layer 6 is formed on the lower magnetic core layer 5 except on the front end portion of the lower magnetic core layer 5 facing the front end portion of the pole region 3 of the upper magnetic core layer 2. The first insulator layer 6 electrically insulates the electrically conductive layer 10 from the lower magnetic core layer 5. A recess 6a is formed at a predetermined spacing from the lower magnetic pole layer 7 toward the back end portion of the upper magnetic core layer 2 to house the electrically conductive layer 10. Referring to FIG. 1, the first insulator layer 6 is a planarizing insulator layer for keeping the flatness in continuity with the back end of the lower magnetic pole layer 7 (in the direction represented by an arrow Y). The first insulator layer 6 includes a flat surface 6b extending at the same level in the direction of height and an inclined surface 6c so that the first insulator layer 6 becomes thinner as the first insulator layer 6 runs in the direction of height. The electrically conductive layer 10 is formed on the gap layer 8 arranged in the recess portion 6a that extends from the inclined surface 6c in the direction of height. The electrically conductive layer 10 may be formed directly in the recess portion 6a extending in continuity with the inclined surface 6c.

The lower magnetic pole layer 7, fabricated of an Fe—Ni based alloy, has the same thickness as that of the first insulator layer 6. The lower magnetic pole layer 7 is laminated on the front end portion of the lower magnetic core layer 5 with the back end thereof in continuity with the front end of the first insulator layer 6. With this arrangement, the top surface of the lower magnetic pole layer 7 is continuously flush with the top surface of the first insulator layer 6. From the standpoint of information writing characteristics, the thickness of the lower magnetic pole layer 7 is preferably 30% to 70% of the overall thickness of the lower magnetic pole layer 7 and the lower magnetic core layer 5, and specifically falls within a range from 0.5 µm to 1.5 µm.

The gap layer 8, fabricated of a non-magnetic material such as $SiO_2$, $Al_2O_3$ or the like, extends over the top surface of the lower magnetic pole layer 7, the top surface of the first insulator layer 6, and the recess 6a of the first insulator layer 6. The pole region 3 of the upper magnetic core layer 2 is formed on the gap layer 8 formed on the lower magnetic pole layer 7. The spacing between the lower magnetic core layer 5 and the upper magnetic core layer 2 (i.e., the thickness of the gap layer 8) in the medium facing surface 16 is defined as a magnetic gap 9. A magnetic circuit is formed of the upper and lower magnetic core layers 2 and 5, and the lower magnetic pole layer 7. The front end of the first insulator layer 6 defines the magnetic gap zero position of the magnetic gap 9. The distance from the medium facing surface 16 to the back end of the lower magnetic pole layer 7 defines the gap depth Gd of the magnetic gap 9.

The electrically conductive layer 10, fabricated of an electrically conductive low-resistance material, such as Cu, is shaped in a spiral configuration within the recess 6a of the first insulator layer 6 in a plan view. The coil layer formation surface 10a of the electrically conductive layer 10 is preferably positioned to be lower in level than the flat surface 6b at which the lower magnetic pole layer 7 is planarized backward in the direction of height. By positioning the flat surface 6b at which the lower magnetic pole layer 7 is planarized backward in the direction of height to be higher in level than the coil layer formation surface 10a of the electrically conductive layer 10, the distance between the gap layer 9 and the back end portion of the upper magnetic core layer 2 is relatively shortened. This arrangement reduces a pattern distortion during the formation of the upper magnetic core layer 2, thereby resulting in an accurate upper magnetic core layer 2.

The second insulator layer 11, fabricated of an organic insulator material such as a novolak resin, is formed on the gap layer 8, covering the electrically conductive layer 10. The second insulator layer 11 is placed, behind the lower magnetic pole layer 7, closer to the back end portion of the upper magnetic core layer 2, thereby electrically insulating the electrically conductive layer 10 from the upper magnetic core layer 2. The second insulator layer 11 has a sloping surface 11a. The upper magnetic core layer 2 is arranged on the second insulator layer 11 and the gap layer 8. The back end 3a of the pole region 3 is opposed to the first insulator layer 6 between the lower magnetic pole layer 7 and the recess 6a.

The manufacturing method of the thin-film magnetic head 1 thus constructed is now discussed.

Figure 4A:
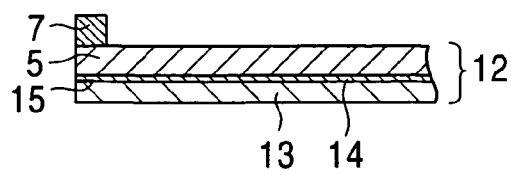
FIGS. 4A–4H are cross-sectional views showing manufacturing steps of a manufacturing method of the thin-film magnetic head of the present invention.
Figure 4B:
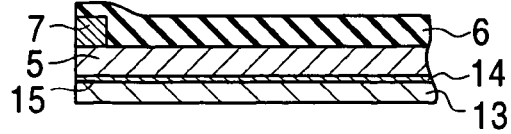
Figure 4C:
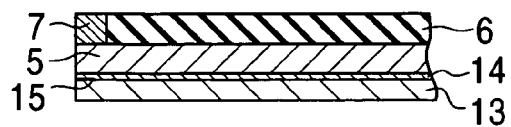
Figure 4D:
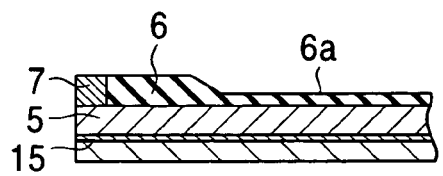

Referring to FIG. 4A, the lower magnetic pole layer 7 is formed on the lower magnetic core layer 5 constituting the magnetoresistive effect head 12 through an electroplating technique. Referring to FIG. 4B, the first insulator layer 6 is formed on the lower magnetic core layer 5 so that the first insulator layer 6 covers the back end portion of the lower magnetic pole layer 7. Referring to FIG. 4C, the first insulator layer 6 is polished using a CPM (Chemical Mechanical Polishing) technique so that the thickness of the first insulator layer 6 becomes equal to the thickness of the lower magnetic pole layer 7. Referring to FIG. 4D, the recess 6a is formed in the first insulator layer 6 using an ion milling process.

Figure 4E:
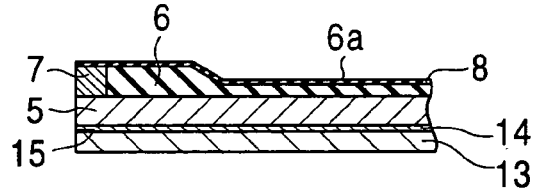
Figure 4F:
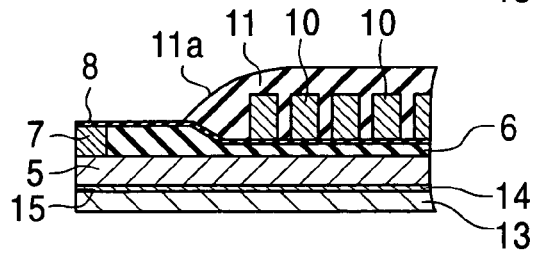

Referring to FIG. 4E, the gap layer 8 is deposited on the lower magnetic pole layer 7, and the first insulator layer 6 including the recess 6a thereof through a sputtering technique. Referring to FIG. 4F, the electrically conductive layer 10 is deposited on the gap layer 8 formed in the recess 6a through a combination of sputtering technique, electroplating technique, and photolithographic technique. The second insulator layer 11 is formed on the gap layer 8 to cover the electrically conductive layer 10 in a manner such that the front end of the second insulator layer 11 is positioned behind the lower magnetic pole layer 7.

Figure 4G:
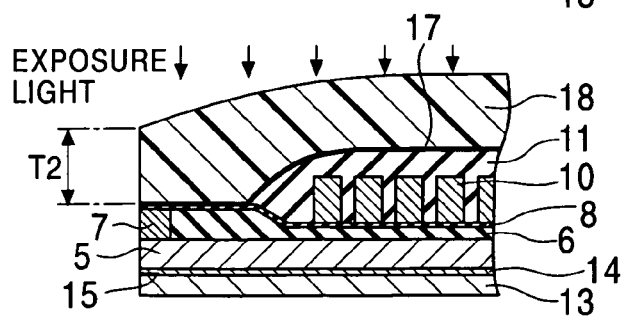

Referring to FIG. 4G, an underlying layer 17, fabricated of a magnetically soft material such as an Fe—Ni based alloy, is plated over from the front end of the gap layer 8 covering the lower magnetic pole layer 7 to the second insulator layer 11. A flowable resist layer 18 is applied on the plated underlying layer 17. Using the photolithographic technique, the resist layer 18 is subjected to exposure and development processes. The resist layer 18 is partly removed, and a pattern corresponding to the shape of the upper magnetic core layer 2 is thus formed on the resist layer 18. Electroplating is performed on the pattern having no resist layer 18 thereon. The upper magnetic core layer 2 is formed on the second insulator layer 11 and the gap layer 8. The residual resist layer 18 is removed, and the resulting lamination is shown in FIG. 4H.

Figure 4H:
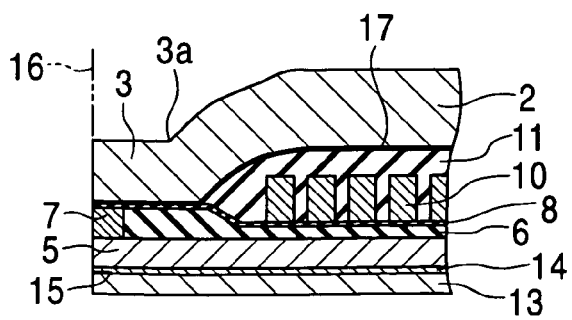
Figure 14:
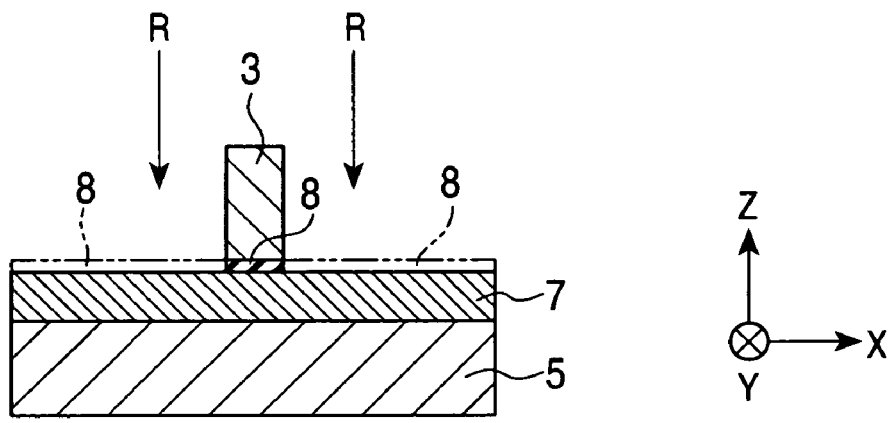
FIG. 14 is a cross-sectional view showing a manufacturing step of the thin-film magnetic head of the present invention.
Figure 15:
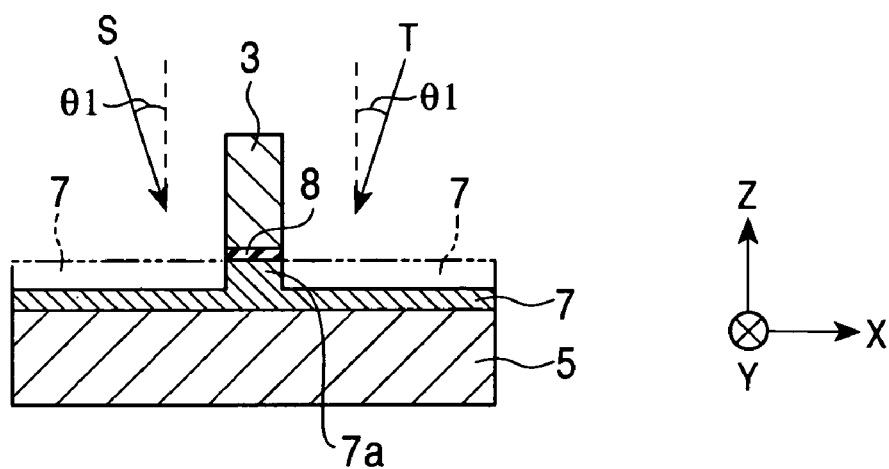
FIG. 15 is a cross-sectional view showing a manufacturing step of the thin-film magnetic head of the present invention.
Figure 16:
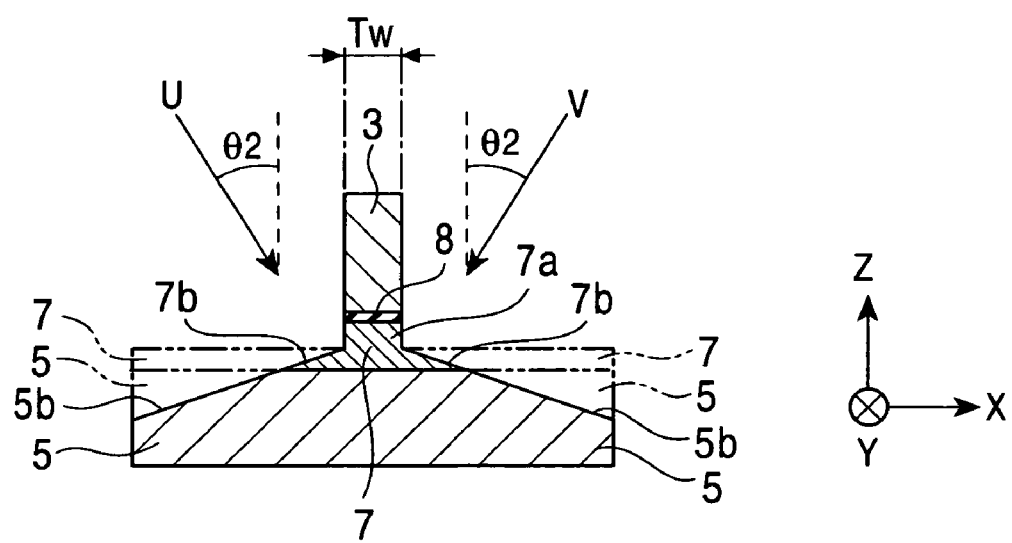
FIG. 16 is a cross-sectional view showing a manufacturing step of the thin-film magnetic head of the present invention.

FIG. 14 through FIG. 16 show manufacturing steps of the thin-film magnetic head, viewed from the magnetic recording medium facing surface 16, in succession to the step shown in FIG. 4H. FIG. 14 through FIG. 16 are thus front views partially showing the thin-film magnetic head showing the formation method of the front configuration of the thin-film magnetic head viewed from the magnetic recording medium facing surface 16 shown in FIG. 2.

In the manufacturing step shown in FIG. 14, a portion of the gap layer 8 laterally extending from the base end of the pole region 3 in the track width direction (namely, in the X direction) is etched away through anisotropic etching performed in the direction of an arrow R (namely, in the vertical direction). The anisotropic etching is plasma etching, for example. In this manufacturing step shown in FIG. 14, the portion of the gap layer 8 indicated by a broken line is removed. The gap layer 8, left behind between the upper magnetic core layer 2 and the second insulator layer 11, has the same width as that of the pole region 3 of the upper magnetic core layer 2, namely, the track width Tw.

Since the plasma etching removes the non-magnetic material through chemical action, the lower magnetic pole layer 7 and the upper magnetic core layer 2 are free from any damage. The lower magnetic pole layer 7 is exposed in the area where the gap layer 8 is removed.

In the manufacturing step shown in FIG. 15, the lower magnetic pole layer 7 on both sides of the track width Tw is partly removed through first ion milling. The first ion milling uses a neutrally ionized argon gas. In the first ion milling, ion irradiation is performed in directions represented by an arrow S and an arrow T. The angle θ1 of ion irradiation falls preferably within a range of 0° to 30°. In the first ion milling, the lower magnetic pole layer 7 is thus irradiated with ions at angles nearly normal to the surface of the lower magnetic pole layer 7.

When the lower magnetic pole layer 7 is irradiated with the ions at angles nearly normal to the surface of the lower magnetic pole layer 7 (as represented by the arrows S and T), a physical action occurs, removing away both sides of the lower magnetic pole layer 7 in a rectangular shape opposed to the gap layer 9. The lower magnetic pole layer 7 has substantially vertical steps. As a result, the neck portion 7a, having the same width as that of the upper magnetic core layer 2 (namely, the track width Tw), is formed beneath the gap layer 9.

Depending on the ion irradiation angle θ1 in the first ion milling, the front end configuration of the neck portion 7a changes. When the ion irradiation angle θ1 is almost normal to the surface of the lower magnetic pole layer 7, the neck portion 7a has a rectangular front view. The ion irradiation angle θ1 is some degree to a line normal to the surface of the lower magnetic pole layer 7, the side surfaces of the neck portion 7a are inclined. The front configuration of the neck portion 7a becomes trapezoidal with the base width dimension thereof being larger than the top width dimension thereof. Although not shown, magnetic particles of the lower magnetic pole layer 7 removed in the first ion milling adhere to the upper magnetic core layer 2, the gap layer 9 and both sidewalls of the neck portion 7a. Such magnetic particles degrade the recording characteristics, and need adequately removing. Second ion milling is then performed to form, on the lower magnetic pole layer 7, sloping surfaces 7b and 7b that are effective for controlling write fringing.

Like the first ion milling, the second ion milling uses a neutrally ionized argon gas. Referring to FIG. 16, ion irradiation is performed at directions represented by arrows U and V. Ion irradiation angles θ2 preferably fall within a range from 45° to 70°. In the second ion milling, the ion irradiation is thus performed at larger angles to a line normal to the surface of the lower magnetic pole layer 7 than in the first ion milling (with the ion irradiation angle θ1 within a range from 0° to 30°).

When the ions are directed at the directions represented by the arrows U and V in the manufacturing step shown in FIG. 16, the side top surfaces of the lower magnetic pole layer 7 extending from the base of the neck portion 7a are cut away in an inclined surface through physical action, thereby creating the sloping surfaces 7b and 7b on the lower magnetic pole layer 7. Along with the cutting of the lower magnetic pole layer 7, both sides of the lower magnetic core layer 5 are also cut, forming sloping surfaces 5b and 5b in continuity with the sloping surfaces 7b and 7b. In the second ion milling, magnetic particles adhering to the pole region 3 of the upper magnetic core layer 2, the gap layer 9, and the sidewalls of the neck portion 7a are removed. The production of the thin-film magnetic head shown in FIGS. 1, 2, and 3 is thus completed. With the magnetic particles removed, no magnetic shortcircuit takes place between the pole region 3 of the upper magnetic core layer 2 and the lower magnetic pole layer 7.

In accordance with the present invention, the first ion milling and the second ion milling also cuts the two sidewalls of the pole region 3 of the upper magnetic core layer 2, and the track width Tw defined by the width dimension of the pole region 3 of the upper magnetic core layer 2 is also reduced. A thin-film magnetic head meeting a narrow-track requirement in accordance with a high-recording density can thus be manufactured. In the present invention, the track width Tw preferably falls within a range of 0.5 μm to 1.5 μm.

Through the first ion milling and the second ion milling, a thin-film magnetic head meeting a narrow-track requirement is thus provided. Further, the generation of write fringing is properly controlled with the neck portion 7a and the sloping surface 7b formed on the lower magnetic pole layer 7, and with the sloping surface 5b formed on the lower magnetic core layer 5.

The production of the thin-film magnetic head 1 is thus completed. Subsequent to the manufacture, the electrically conductive layer 10 is arranged between the upper and lower magnetic core layers 2 and 5. The first insulator layer 6 is deposited between the lower magnetic core layer 5 and the electrically conductive layer 10. The second insulator layer 11 is deposited between the upper magnetic core layer 2 and the electrically conductive layer 10.

The thin-film magnetic head 1 thus manufactured is assembled together with the magnetoresistive effect head 12 in a magnetic recording and reproducing apparatus of a magnetic disk. With a recording current flowing through the electrically conductive layer 10 of the thin-film magnetic head 1, a recording magnetic field is induced in the upper and lower magnetic core layers 2 and 5, and the lower magnetic pole layer 7. A leakage magnetic field from the magnetic gap 9 on the medium facing surface 16 writs information on the magnetic recording medium. The written information is then read in the form of electrical resistance variation in the magnetoresistive effect element 15 in the magnetoresistive effect head 12.

In the thin-film magnetic head 1, the first insulator layer 6 is arranged beneath the gap layer 8, and the second insulator layer 11 is arranged on the gap layer 8. The thickness T1 from the top surface of the gap layer 8 to the top surface of the second insulator layer 11 is smaller than the thickness T1 in the conventional thin-film magnetic head 21 by the thickness of the first insulator layer 6. For this reason, the film thickness T2 of the resist layer 18 extending from the front end of the gap layer 8 to the sloping surface 11a of the upper magnetic core layer 2 is thinned. As a result, without lowering the dimensional accuracy of the pattern formed in the resist layer 18, the width of the pole region 3 of the upper magnetic core layer 2, namely, the track width Tw is formed in compliance with the narrow track requirement with high accuracy.

Since the electrically conductive layer 10 is accommodated in the first insulator layer 6 in the thin-film magnetic head 1, the thickness T1 from the top surface of the gap layer 8 to the top surface of the second insulator layer 11 is smaller than that in the conventional thin-film magnetic head 21. This arrangement provides an even higher accuracy track width Tw.

In the thin-film magnetic head 1, the gap depth zero position of the magnetic gap 9 is defined by the position of the front end of the first insulator layer 6. The second insulator layer 11 is shifted backward toward the back end portion of the upper magnetic core layer 2 (in the Y direction) without enlarging the gap depth Gd as in the conventional thin-film magnetic head 21. The pole region 3 is designed to be long enough to position the back end 3a of the pole region 3 to be opposed to the first insulator layer 6 between the lower magnetic pole layer 7 and the recess 6a. This arrangement controls, on the pattern, the effect of light directed to resist layer 18 for exposure and diffusely reflected from the sloping surface 11a of the second insulator layer 11, and allows the front end portion of the pole region 3 of the upper magnetic core layer 2 to have the track width Tw with high accuracy, thereby improving the information writing characteristics to the magnetic recording medium. The first insulator layer 6 works as a planarizing insulator layer to keep itself flush with the top surface of the lower magnetic pole layer 7 in the direction of height (i.e., in the Y direction). With the top surface of the lower magnetic pole layer 7 flush with the flat surface 6b of the first insulator layer 6, the front end portion of the upper magnetic core layer 2 on the gap layer 8 laminated on the lower magnetic pole layer 7 and the flat surface 6b remains flat keeping the same level for a distance from the medium facing surface 16 in the direction of height. As a result, without lowering the dimensional accuracy of the pattern formed in the resist layer 18, the width of the pole region 3 of the upper magnetic core layer 2, namely, the track width Tw is formed in compliance with the narrow track requirement with high accuracy.

Figure 6:
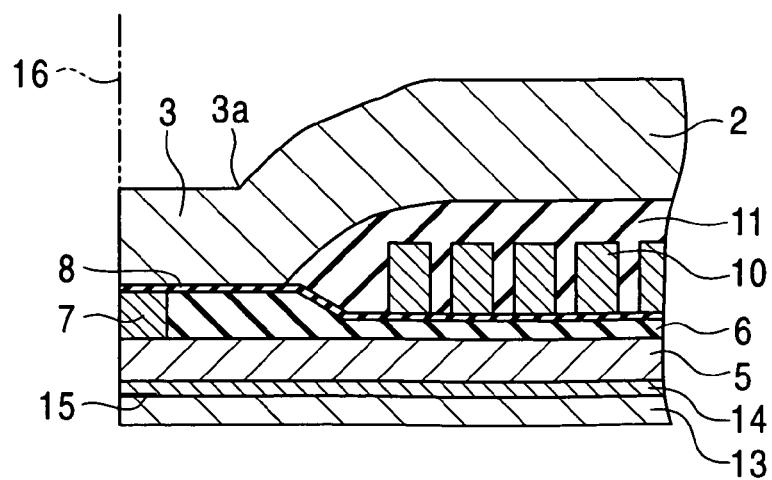
FIG. 6 is a cross-sectional view of the thin-film magnetic head of the present invention having a short gap layer.

In the thin-film magnetic head 1, the gap layer 8 extends between the electrically conductive layer 10 and the first insulator layer 6, thereby ensuring electrical insulation between the electrically conductive layer 10 and the lower magnetic core layer 5. When the first insulator layer 6 alone provides sufficient electrical insulation between the electrically conductive layer 10 and the lower magnetic core layer 5, a short gap layer 8 extending a short distance from the medium facing surface 16 and not reaching the electrically conductive layer 10 may be employed as shown in FIG. 6. In this case, the gap layer 8 may be fabricated of an electrically conductive non-magnetic material such as NiP. More freedom is therefore allowed in the selection of materials for the gap layer 8.

Figure 5:
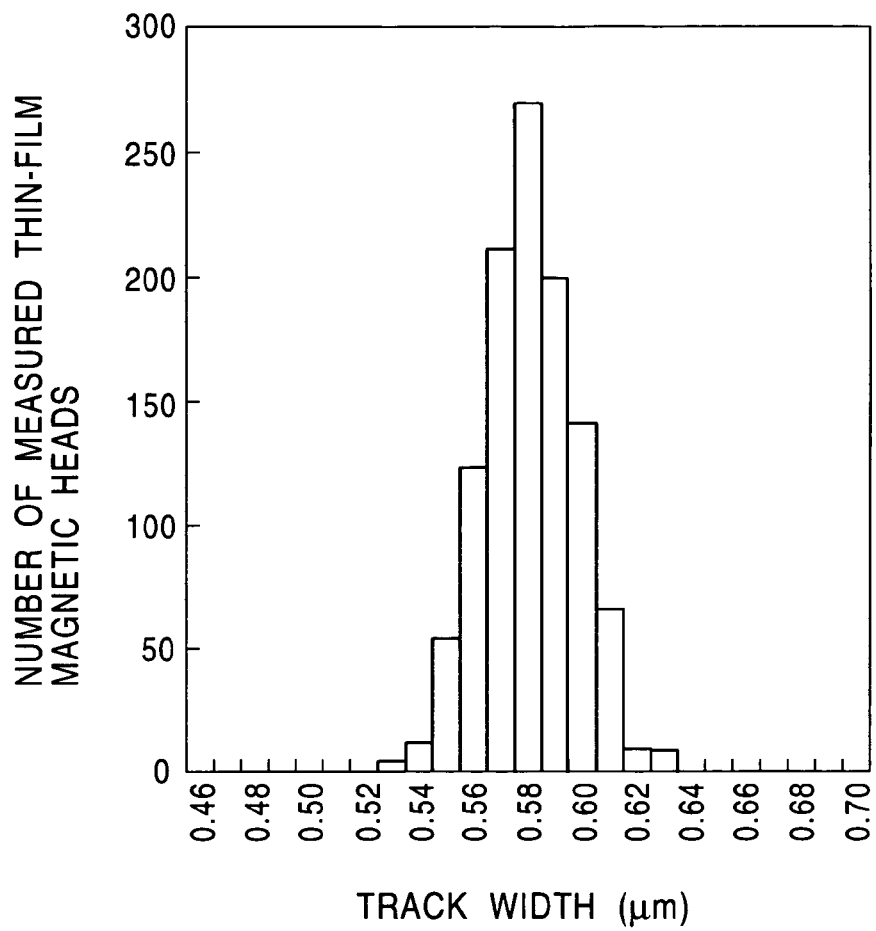
FIG. 5 is a graph plotting results of measurement of track width of thin-film magnetic heads of the present invention.

FIG. 5 is a graph plotting the results of measurement of the track widths Tw of a plurality of thin-film magnetic heads 1. Compared with the conventional art, the track widths Tw of the thin-film magnetic heads 1 have small variations with respect to a rated value of 0.57 μm. This graph indicates that the pole region 3 of the upper magnetic core layer 2 is formed with a good accuracy.

Figure 7:
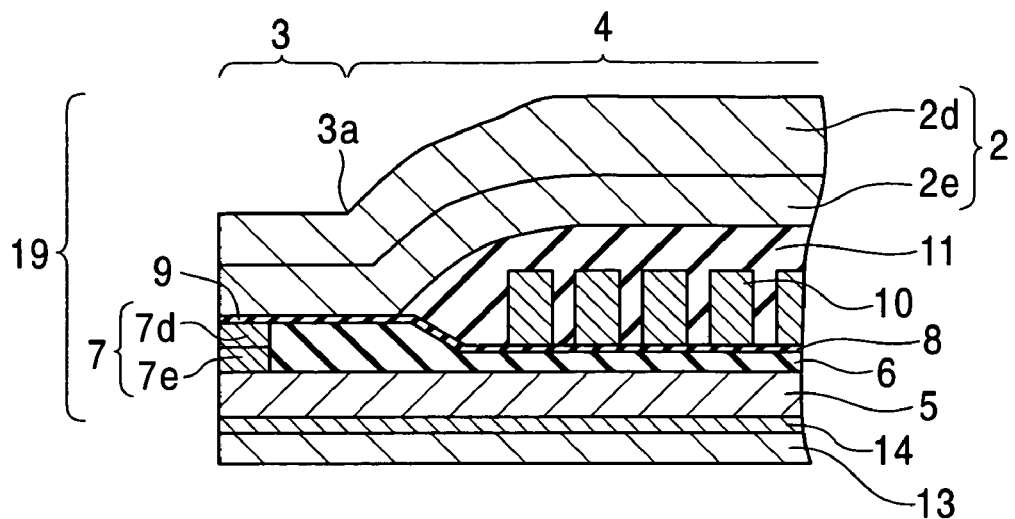
FIG. 7 is a cross-sectional view showing an alternate embodiment of the thin-film magnetic head of the present invention.
Figure 8:
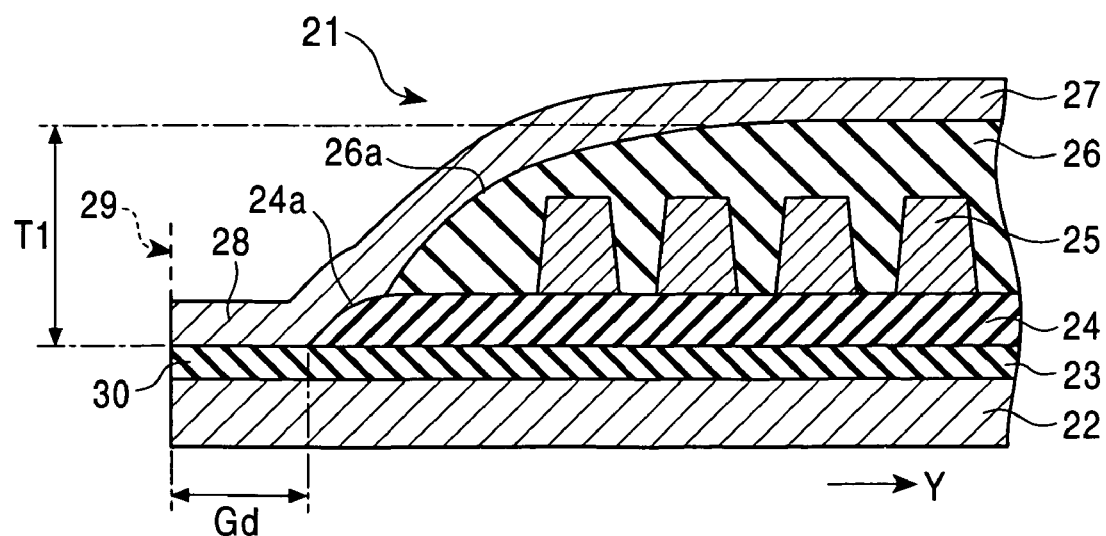
FIG. 8 is a cross-sectional view of a conventional thin-film magnetic head.
Figure 9:
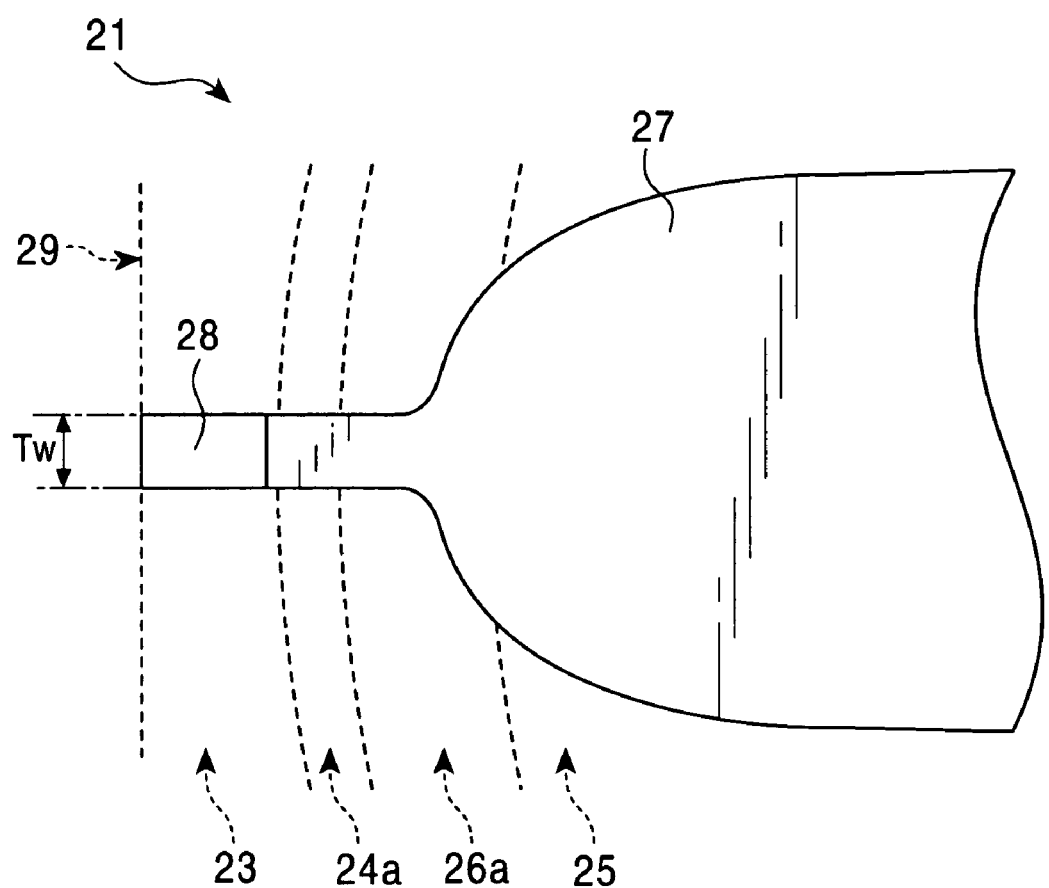
FIG. 9 is a plan view showing the conventional thin-film magnetic head.
Figure 10A:
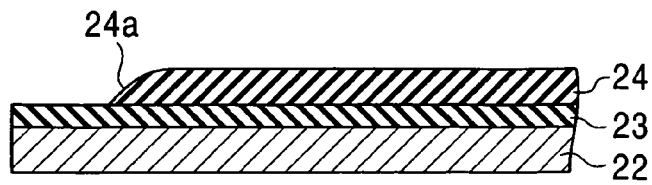
FIGS. 10A–10D are cross-sectional views showing manufacturing steps of a manufacturing method of the conventional thin-film magnetic head.
Figure 10B:
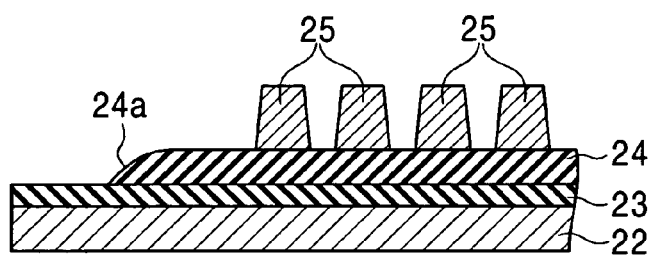
Figure 10C:
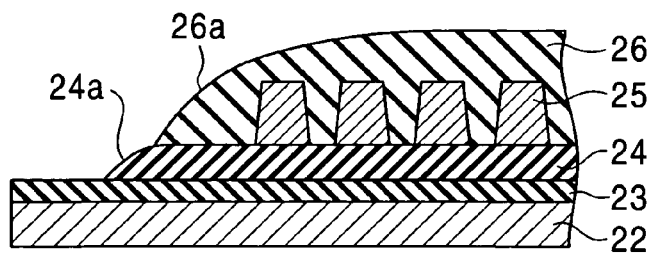
Figure 10D:
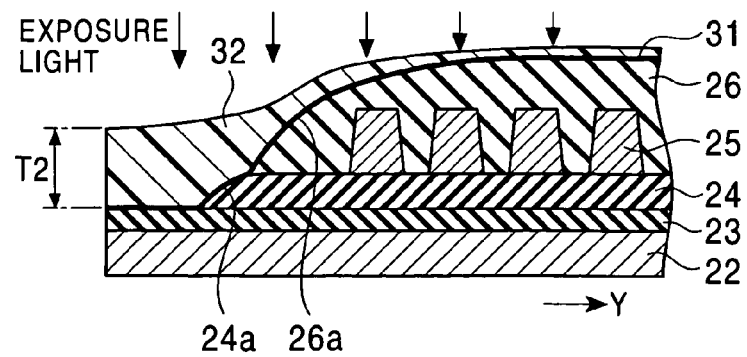

FIG. 7 shows a thin-film magnetic head 19 of another embodiment of the present invention. The difference of the thin-film magnetic head 19 from the thin-film magnetic head 1 lies in that each of the upper magnetic core layer 2 and the lower magnetic pole layer 7 has a dual-layer structure with a bottom layer 2e of the upper magnetic core layer 2 laminated on a top layer 7d of the lower magnetic pole layer 7 with the gap layer 8 interposed therebetween, and that the saturation flux density of the bottom layer 2e of the upper magnetic core layer 2 and the top layer 7d of the lower magnetic pole layer 7 is set to be higher than the saturation flux density of a top layer 2d of the upper magnetic core layer 2 and a bottom layer 7e of the lower magnetic pole layer 7. The rest of the construction of the thin-film magnetic head 19 remains unchanged from that of the thin-film magnetic head 1.

Each of these layers is formed through electroplating. The bottom layer 2e of the upper magnetic core layer 2 and the top layer 7d of the lower magnetic pole layer 7 respectively employ Ni 50 atomic % and Fe 50 atomic %, and the top layer 2d of the upper magnetic core layer 2 and the bottom layer 7e of the lower magnetic pole layer 7 respectively employ Ni 80 atomic % and Fe 20 atomic %. Each of the bottom layer 2e of the upper magnetic core layer 2 and the top layer 7d of the lower magnetic pole layer 7 is preferably 0.3 μm or more in thickness.

The thin-film magnetic head 19 thus constructed concentrates a larger number of magnetic fluxes in the magnetic gap 9, improving information writing characteristics to the magnetic recording medium.

Figure 12:
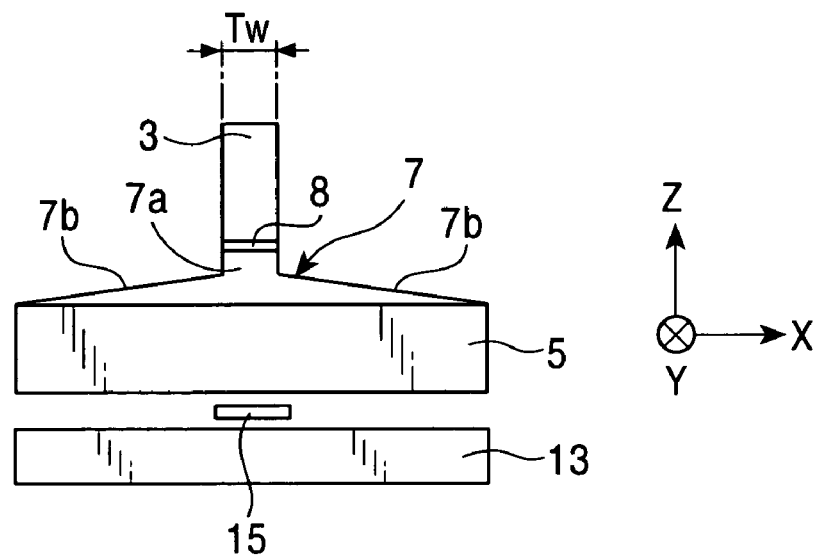
FIG. 12 is a front view partially showing another thin-film magnetic film of the present invention.
Figure 13:
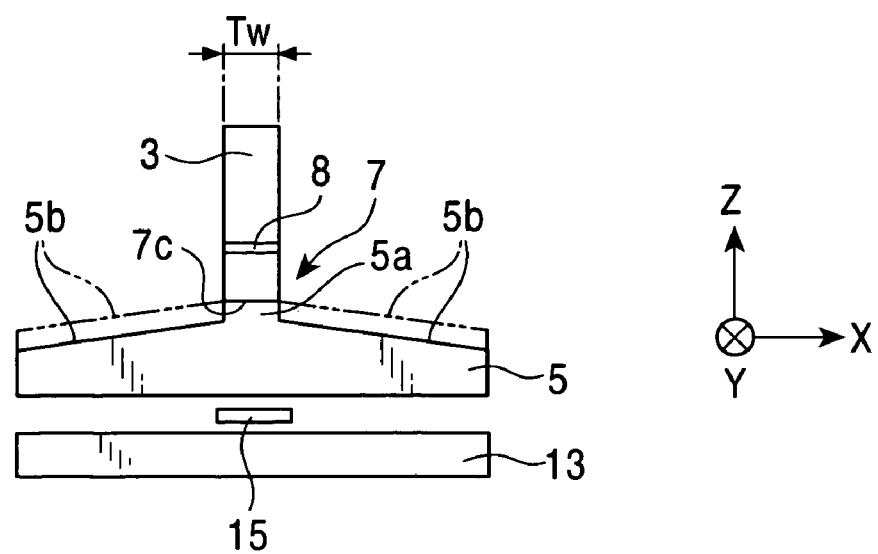
FIG. 13 is a front view partially showing yet another thin-film magnetic film of the present invention.

FIG. 12 and FIG. 13 are front views showing the thin-film head structures of modifications of the thin-film magnetic head shown in FIG. 2, exposed to the recording medium facing surface thereof.

In the modification shown in FIG. 12, the gap layer 9 has the track width Tw as shown in FIG. 2. The lower magnetic pole layer 7 includes a neck portion 7a having a junction surface with the gap layer 9 as wide as the track width Tw, and sloping surfaces 7b and 7b, on the two sidewalls thereof, inclined and spaced apart from the pole region 3 of the upper magnetic core layer 2 as the lower magnetic pole layer 7 runs in the direction of width. In this modification, the sloping surface 7b is formed on the lower magnetic pole layer 7, and no sloping surface 5b is formed on the lower magnetic core layer 5 unlike the embodiment shown in FIG. 2.

In the modification shown in FIG. 13, the gap layer 9 sandwiched between the pole region 3 and the lower magnetic pole layer 7 has the track width Tw in the magnetic recording medium facing surface. The lower magnetic pole layer 7 has the junction surface with the gap layer 9 as wide as the track width Tw. The lower magnetic core layer 5 has a neck portion 5a in continuity with the lower magnetic pole layer 7. The lower magnetic core layer 5 also includes sloping surfaces 5b and 5b in continuity with the base end of the neck portion 5a and inclined and spaced apart from the pole region 3 of the upper magnetic core layer 2 as the lower magnetic core layer 5 extends in the direction of width.

In the modification shown in FIG. 13, the lower magnetic pole layer 7 from the top end to the base end 7c in contact with the lower magnetic core layer 5 forms a rectangular shape having the track width Tw in the magnetic recording medium facing surface thereof. The lower magnetic pole layer 7 may be trapezoidal with the base end 7c in excess of the track width Tw. As represented by broken lines in FIG. 13, the lower magnetic core layer 5 has no neck portion 5a, and includes, on both sides thereof, sloping surfaces 5b and 5b extending from the base end of the lower magnetic pole layer 7.

The neck portion 7a of the lower magnetic pole layer 7 shown in FIGS. 2 and 12, and the neck portion 5a of the lower magnetic core layer 5 shown in FIG. 5 may keep the same width dimension thereof from the top end to the bottom end, forming a rectangular end face in the magnetic recording facing surface, or may be generally of a trapezoidal shape with the top end being smaller in width than the bottom end, or may be generally of an inverted trapezoidal shape with the top end being larger in width than the bottom end.

In the modifications shown in FIG. 12 and FIG. 13, the lower magnetic pole layer 7 and the lower magnetic core layer 5 may respectively have no sloping surfaces 5b and 7b, and may instead have flat surface extending in parallel with the track width direction (i.e., the X direction).

Referring to FIG. 2, FIG. 12, and FIG. 13, the lower magnetic pole layer 7 has the track width Tw at the junction surface thereof with the gap layer 9. Further, the neck portion 7a or the sloping surface 7b is formed. Equally, the neck portion 5a or the sloping surface 5b may be formed on the lower magnetic core layer 5. With this arrangement, the top side of the laterally extending surface of the lower magnetic pole layer 7 and the top side of the laterally extending surface of the lower magnetic core layer 5 are properly spaced apart from the upper magnetic core layer 2. Compared with the thin-film magnetic head having no neck portion 7a in the lower magnetic pole layer 7, the generation of the write fringing is properly controlled while the narrow track design is implemented.

In the creation of the front configurations of the thin-film magnetic heads shown in FIG. 12 and FIG. 13, the milling time and milling angle must be adjusted in the first ion milling and the second ion milling.

In the front configuration of the thin-film magnetic head shown in FIG. 12, the ion irradiation angle θ2 is increased in the second ion milling to be larger than that in the step shown in FIG. 16. The sloping surfaces 7b and 7b are thus formed in the lower magnetic pole layer 7 only, with no sloping surfaces created on the lower magnetic core layer 5.

In the front configuration of the thin-film magnetic head shown in FIG. 13, the milling time is lengthened in the first ion milling to remove the full side portions of the lower magnetic pole layer 7 from the base end of the gap layer 9. The width dimension of the junction surface of the lower magnetic pole layer 7 with the gap layer 9 is set to be the track width Tw. The lower magnetic pole layer 7 is set to be a rectangular shape in the magnetic recording medium facing surface thereof, or is set to be a trapezoidal shape in the magnetic recording medium facing surface with the base end thereof with the lower magnetic core layer 5 larger in width than the junction surface thereof with the gap layer 9. By lengthening further the milling time, the neck portion 5a having the same width dimension as that of the base end of the lower magnetic pole layer 7 is formed. In the second ion milling thereafter, the sloping surfaces 5b and 5b extending from the base end of the neck portion 5a and inclined downwardly as being spaced apart from the pole region 3 are formed on both sides of the lower magnetic core layer 5.

When the lower magnetic core layer 5 and the lower magnetic pole layer 7 are of one-piece molded construction, the above method is applicable. The lower magnetic pole layer 7 and the lower magnetic core layer 5 are formed in a neck portion. The sloping surfaces 5b and 5b extending from the base end of the lower magnetic pole layer 7 and inclined downwardly as being spaced apart from the pole region 3 are formed on both sides of the lower magnetic core layer 5.

Through the first ion milling and the second ion milling, a thin-film magnetic head meeting a narrow-track requirement is thus provided. Further, the generation of write fringing is properly controlled with the neck portion 7a and the sloping surface 7b formed on the lower magnetic pole layer 7, and with the sloping surface 5b formed on the lower magnetic core layer 5.

The present invention is embodied as described above, and have the following advantages.

The thin-film magnetic head includes the upper magnetic core layer, the lower magnetic core layer arranged to be opposed to the upper magnetic core layer, the electrically conductive coil layer sandwiched between the upper magnetic core layer and the lower magnetic core layer, the first insulator layer, sandwiched between the lower magnetic core layer and the electrically conductive coil layer, for electrically insulating the lower magnetic core layer from the electrically conductive coil layer, the second insulator layer, sandwiched between the upper magnetic core layer and the electrically conductive coil layer, for electrically insulating the upper magnetic core layer from the electrically conductive coil layer, wherein the first insulator layer is arranged on the lower magnetic core layer except the front end portion of the lower magnetic core layer facing the front end portion of the upper magnetic core layer, the lower magnetic pole layer having a thickness equal to that of the first insulator layer is arranged in continuity with the end of the first insulator layer on the front end portion of the lower magnetic core layer between the upper magnetic core layer and the lower magnetic core layer, the front end portion of the upper magnetic core layer is arranged on the gap layer on the lower magnetic pole layer, and the second insulator layer is positioned behind the lower magnetic layer and close to the back end of the upper magnetic core layer. The thickness from the top surface of the gap layer to the top surface of the second insulator layer is reduced by the thickness of the first insulator layer. For this reason, the film thickness of the resist layer required to form the gap layer is thinned. As a result, the width of the upper magnetic core layer, namely, the track width is formed in compliance with the narrow track requirement with high accuracy.

Since the recess is formed in the first insulator layer at a predetermined distance from the lower magnetic pole layer toward the upper magnetic core layer, the thickness from the top surface of the gap layer to the top surface of the second insulator layer is thus reduced. This arrangement provides an even higher accuracy track width.

The upper magnetic core layer includes a narrow-width pole region formed on the gap layer on the lower magnetic pole layer, and a yoke region being wider in width than the pole region, arranged in continuity with the back end of the pole region, and the back end of the pole region is opposed to the first insulator layer between the lower magnetic pole layer and the recess. Since the length of the pole region is increased, the front end portion of the pole region is set to be the track width Tw with a good accuracy. The information writing characteristics to the magnetic recording medium are thus improved.

Each of the upper magnetic core layer and the lower magnetic pole layer is of a dual-layer structure, the bottom layer of the upper magnetic core layer is arranged on the gap layer on the top layer of the lower magnetic pole layer, and the saturation flux density of the bottom layer of the upper magnetic core layer and the top layer of the lower magnetic pole layer is set to be higher than the saturation flux density of the top layer of the upper magnetic core layer and the bottom layer of the lower magnetic pole layer. The information writing characteristics to the magnetic recording medium are thus improved.

Since the gap layer extends between the electrically conductive coil layer and the first insulator layer, electrical insulation is further assured between the electrically conductive layer and the lower magnetic core layer.

Since the lower magnetic core layer also serves as a top shield layer of a magnetoresistive head for reading information from a magnetic recording medium, the manufacturing step in a combination of the magnetoresistive head with the thin-film magnetic head is simplified. The information reading characteristics from the magnetic recording medium are thus improved.

The method for manufacturing a thin-film magnetic head, includes the steps of forming the lower magnetic pole layer on a lower magnetic core layer, forming the first insulator layer on the lower magnetic core layer in a manner such that the first insulator layer covers the back end portion of the lower magnetic pole layer, polishing the first insulator layer so that the thickness of the first insulator layer is equal to the thickness of the lower magnetic pole layer, forming the recess in the first insulator layer, forming the gap layer on the lower magnetic pole layer and the first insulator layer in a manner such that the gap layer extends into the recess, forming the electrically conductive coil layer on the gap layer formed in the recess, forming the second insulator layer for covering the electrically conductive coil layer on the gap layer so that the end portion of the second insulator layer is positioned behind the lower magnetic pole layer, and forming the upper magnetic core layer on the second insulator layer and the gap layer. The thickness from the top surface of the gap layer to the top surface of the second insulator layer is reduced by the thickness of the first insulator layer. For this reason, the film thickness of the resist layer for forming the gap layer is thinned. As a result, the width of the upper magnetic core layer, namely, the track width is formed in compliance with the narrow track requirement with high accuracy.

What is claimed is:

1. A thin-film magnetic head comprising an upper magnetic core layer, a lower magnetic core layer arranged to be opposed to the upper magnetic core layer, an electrically conductive coil layer sandwiched between the upper magnetic core layer and the lower magnetic core layer, a first insulator layer, sandwiched between the lower magnetic core layer and the electrically conductive coil layer, for electrically insulating the lower magnetic core layer from the electrically conductive coil layer, a second insulator layer, sandwiched between the upper magnetic core layer and the electrically conductive coil layer, for electrically insulating the upper magnetic core layer from the electrically conductive coil layer, wherein the first insulator layer is arranged on the lower magnetic core layer except a front end portion of the lower magnetic core layer facing a front end portion of the upper magnetic core layer, a lower magnetic pole layer having a thickness equal to that of the first insulator layer is arranged in continuity with the end of the first insulator layer on the front end portion of the lower magnetic core layer between the upper magnetic core layer and the lower magnetic core layer, the front end portion of the upper magnetic core layer is arranged on a gap layer on the lower magnetic pole layer, and the second insulator layer is positioned behind the lower magnetic pole layer and close to a back end of the upper magnetic core layer, wherein the upper magnetic core layer comprises a narrow-width pole region with the end portion thereof formed on the gap layer on the lower magnetic pole layer, and a yoke region being wider in width than the pole region, arranged in continuity with a back end of the pole region, wherein the width of the front end portion of the upper magnetic core layer combines with the width of the lower magnetic pole layer and the width of the gap layer to constitute the track width, and wherein the upper magnetic core layer is integrally formed of a one piece article composed of a single magnetic material of an FeNi based alloy, and is provided so as to cover the second insulator layer.

2. A thin-film magnetic head according to claim 1, wherein the first insulator layer comprises a recess, for receiving the electrically conductive coil layer, arranged at a predetermined distance from the lower magnetic pole layer, between the lower magnetic pole layer and the back end portion of the upper magnetic core layer.

3. A thin-film magnetic head according to claim 1, wherein the upper magnetic core layer comprises a narrow-width pole region with the end portion thereof formed on the gap layer on the lower magnetic pole layer, and a yoke region being wider in width than the pole region, arranged in continuity with the back end of the pole region, and wherein the back end of the pole region is opposed to the first insulator layer between the lower magnetic pole layer and the recess.

4. A thin-film magnetic head according to claim 1, wherein each of the upper magnetic core layer and the lower magnetic pole layer is of a dual-layer structure, the bottom layer of the upper magnetic core layer is arranged on the gap layer on the top layer of the lower magnetic pole layer, and the saturation flux density of the bottom layer of the upper magnetic core layer and the top layer of the lower magnetic pole layer is set to be higher than the saturation flux density of the top layer of the upper magnetic core layer and the bottom layer of the lower magnetic pole layer.

5. A thin-film magnetic head according to claim 1, wherein the gap layer extends between the electrically conductive coil layer and the first insulator layer.

6. A thin-film magnetic head according to claim 1, wherein the lower magnetic core layer also serves as a top shield layer of a magnetoresistive head for reading information from a magnetic recording medium.

7. The thin-film magnetic head according to claim 1, wherein, on the lower magnetic pole layer, sloping surfaces inclined and spaced apart on both sides in the track width direction from the pole region of the upper magnetic core layer.

8. The thin-film magnetic head according to claim 1, wherein the thickness of the lower magnetic pole layer is 30% to 70% of the overall thickness of the lower magnetic pole layer and the lower magnetic core layer.

9. A thin-film magnetic head comprising a lower magnetic core layer, a lower magnetic pole layer formed on the lower magnetic core layer, a non-magnetic gap layer formed at least on the lower magnetic pole layer, an upper magnetic core layer on the gap layer in a surface facing a recording medium, and a coil layer formed behind the lower magnetic layer in the direction of height, for inducing a recording magnetic field in the lower magnetic core layer and the upper magnetic core layer, wherein the upper magnetic core layer comprises a front end region having a track width and exposed on the surface facing the recording medium, and a backward region extending backward from a back end of the front end region in the direction of height, the backward region having the width widening as the upper magnetic core layer runs backward;

a planarizing insulator layer is formed to keep in the direction of height a flat surface at the same level in continuity with the top surface of the lower magnetic pole layer, wherein the planarizing insulator layer has a flat surface remaining constant in level and a downwardly inclined surface so that the planarizing insulator layer is gradually thinner toward the backward end thereof, the flat surface is higher in level than a coil layer formation surface on which the coil layer is formed and lower in level than a top surface of the coil layer, wherein the width of a front end portion of the upper magnetic core layer combines with the width of the lower magnetic pole layer and the width of the gap layer to constitute the track width, and wherein the upper magnetic core layer is integrally formed of a one piece article composed of a single magnetic material of an FeNi based alloy, and is provided so as to cover the second insulator layer.

10. A thin-film magnetic head according to claim 9, wherein the coil layer is formed directly on the planarizing insulator layer extending backward in the direction of height or on the gap layer formed on the planarizing insulator layer.

11. A thin-film magnetic head according to claim 9, wherein the lower magnetic pole layer is higher in saturation flux density than the lower magnetic core layer.

12. A thin-film magnetic head according to claim 9, wherein the lower magnetic pole layer comprises a laminate of at least two magnetic layers and wherein a magnetic layer closer to the gap layer has a higher saturation flux density.

13. A thin-film magnetic head according to claim 9, wherein the upper magnetic core layer on the front end portion thereof comprises a laminate of at least two magnetic layers, and wherein a magnetic layer closer to the gap layer has a higher saturation flux density.

14. The thin-film magnetic head according to claim 9 wherein, on the lower magnetic pole layer, slopping surfaces inclined and spaced apart on both sides in the track width direction from the pole region of the upper magnetic core layer.

15. The thin-film magnetic head according to claim 9, wherein the thickness of the lower magnetic pole layer is 30% to 70% of the overall thickness of the lower magnetic pole layer and the lower magnetic core layer.

* * * * *

UNITED STATES PATENT AND TRADEMARK OFFICE
CERTIFICATE OF CORRECTION

| | | |
|---|---|---|
| PATENT NO. | : 7,190,553 B2 | Page 1 of 1 |
| APPLICATION NO. | : 09/822576 | |
| DATED | : March 13, 2007 | |
| INVENTOR(S) | : Sumihito Morita et al. | |

It is certified that error appears in the above-identified patent and that said Letters Patent is hereby corrected as shown below:

In the Claims

Column 18, in claim 14, line 2, after "magnetic pole layer," delete "slopping" and substitute --sloping-- in its place.

Signed and Sealed this

Tenth Day of July, 2007

JON W. DUDAS
*Director of the United States Patent and Trademark Office*